UNITED STATES PATENT OFFICE.

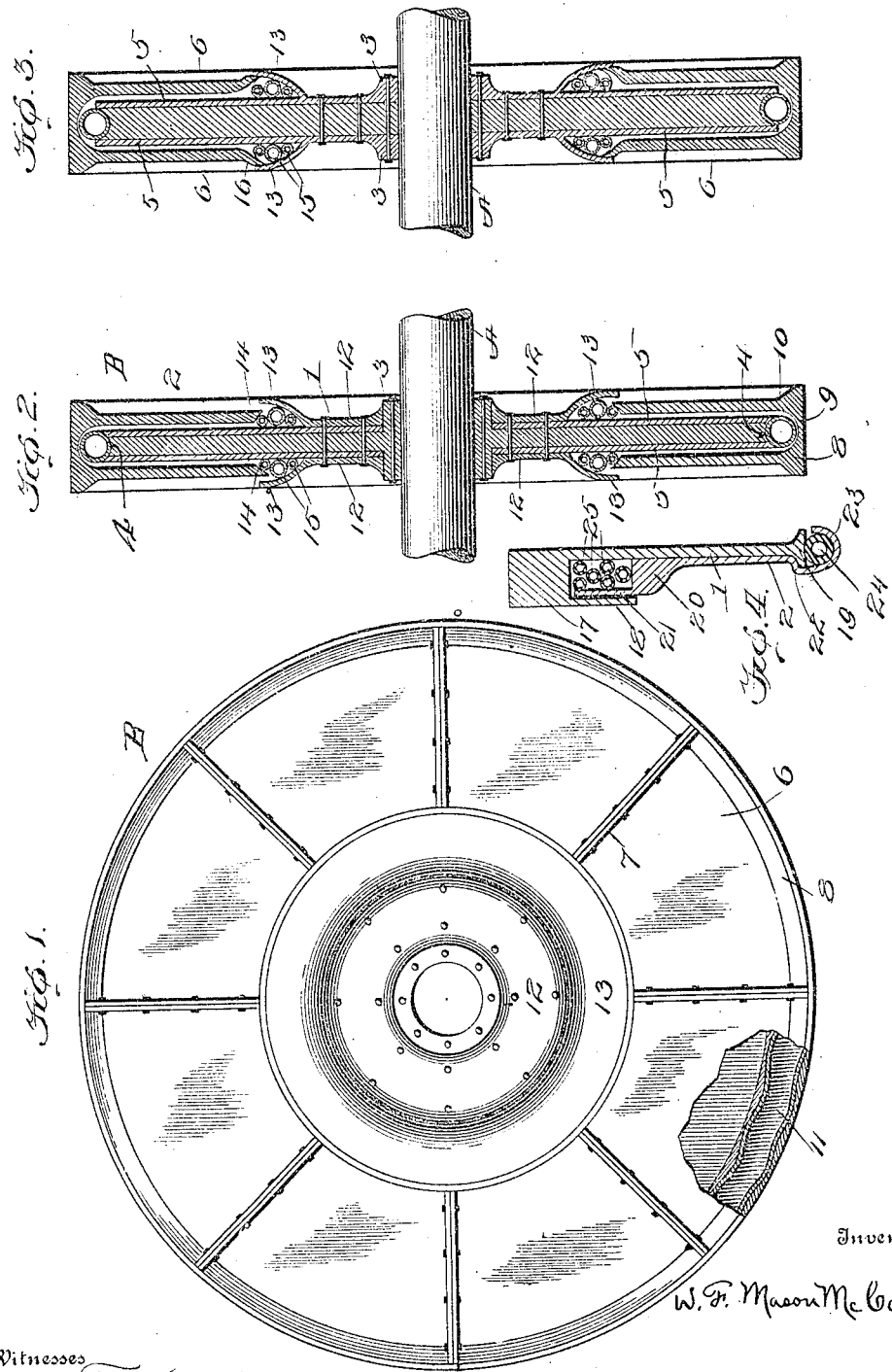

WILLIAM F. MASON McCARTY, OF PLEASANTVILLE, NEW YORK.

VEHICLE-WHEEL.

No. 852,289.  Specification of Letters Patent.  Patented April 30, 1907.

Application filed December 19, 1906. Serial No. 348,639.

*To all whom it may concern:*

Be it known that I, WILLIAM F. MASON McCARTY, a citizen of the United States, residing at Pleasantville, in the county of Westchester and State of New York, have invented certain new and useful Improvements in Vehicle-Wheels, of which the following is a specification.

This invention relates to new and useful improvements in vehicle wheels and it has particular reference to a wheel of the "cushion type" employed for heavy road work.

In connection with a wheel of the above type the invention aims to provide a novel construction, combination and arrangement of cushioning elements, whereby the wheel constituted thereof shall be simple in construction, inexpensive to manufacture and practical and efficient in use.

The detailed construction will appear in the course of the following description in which reference is had to the accompanying drawings forming a part of this specification, like characters of reference designating similar parts throughout the several views, wherein.

Figure 1 is a side elevation, partly in section, of a cushion wheel constructed in accordance with my invention. Fig. 2 is a transverse sectional view thereof. Fig. 3 is a transverse sectional view of a slightly modified adaptation of the invention, and Fig. 4 is a partial sectional view of a still further modified construction.

Referring specifically to the accompanying drawing the letter A designates an axle or hub, and the letter B the wheel mounted thereon. The wheel B comprises an inner section 1 and an outer section 2. The section 1 is secured to the hub or axle A, as the case may be and is of substantial disk shape.

In the preferred embodiment of the invention as shown in Fig. 2, the section 1 at its inner edge has an annular collar 3 and at its outer edge an annular peripheral groove 4. To the sides of the section 1 there are secured co-extensive liners 5 projecting slightly beyond the edges of the groove 4. The outer section 2 loosely surrounds the section 1 in concentric relation and is constituted of a plurality of wedge shaped plates 6 united together by suitable fastening means passing through their adjacent confronting flanges 7. The plates 6 are arranged in corresponding pairs on each side of the section 1 and in such arrangement are united by an integral tread portion 8. The tread portions 8 have curved outer faces which co-act throughout the series to afford an annular peripheral surface. The inner faces of the tread portions 8 are likewise curved peripherally and are arranged in spaced relation to the outer peripheral edge 4 of the section 1. In such disposition the tread portions 8 are grooved as at 9. The grooves 4 and 9 are designed to conform to the cross sectional curvature of a cushioning tube 10 held therebetween. In order to prevent the creeping of the tube or of either of the sections 1 and 2, the surfaces of said grooves 4 and 9 are serrated or corrugated as at 11. This last named feature is clearly shown in Fig. 1. Adjacent the collar 3 there are secured to the wheel 1 on each side thereof, annular plates 12 which are co-extensive and which adjacent their edges are gradually off-set as at 13 so that a space occurs between the same and the adjacent liner 5. It is preferred that the inner edges of the plates 6 project slightly into such space and overlie the off-sets 13. Said inner edges are oppositely beveled on each side of the wheel 1 as at 14. Between the inner beveled edges 14, and the plate 12 a series of elastic cushioning tubes or bands 15 is interposed. It will thus be seen that the plates 12 afford a dust guard for the inner section 1 and for all the concealed parts and in this function co-operate with the plates 6 of the outer section 2. It will be understood that the disclosure is purely arbitrary as regards the cushioning elements since springs or other resilient members may be employed instead of the tubes 9 and 15.

The modification illustrated in Fig. 3 differs from that shown in Fig. 2, in that the plates 12 are eliminated and the off-sets 13 are cast integral with the liner 5. In this modified embodiment the collar 3 is constituted by flanging or enlarging the inner edges of the liners 5. A further departure from the embodiment described, consists in extending the edges of the plate 6 as at 16, so as to bring them into positive contact with the sides of the off-sets 13 for the obvious purpose of affording a more efficacious dust seal or guard.

The modified construction of Fig. 4 involves the same principles of assemblage and operation as the constructions of Figs. 2 and 3, but differs materially therefrom in its detailed elements. The inner section 1 at its inner edge has an enlarged portion 17 provided with a depending flange 18 parallel with the body portion of said section. The outer edge of said section 1 has an enlarged or flanged portion 19. The outer section 2 is arranged only on one side of the section 1 and at its inner edge has an enlarged portion 20 having an inwardly projecting flange 21 which overlaps the flange 18 and co-acts with the section 1 to afford a closed annular recess. Adjacent its outer edge the section 2 is off-set as at 22 to conform to the adjacent side of the flange 19 and is then bent upon itself as at 23 to afford an annular recess or way for the reception of a tread cushioning tube 24. Cushioning tubes 25 are interposed between the adjacent edges of the enlarged portions 17 and 20 of said respective sections.

From the foregoing description the advantages of the wheel embodied in the present invention, in practical use, will be readily apparent. When the outer section encounters an obstruction or surface irregularity, the initial shock is absorbed by the cushioning elements embodied in the wheel and is hence prevented from violent reaction upon the inner section of the wheel, the axle or the spring of the vehicle. Owing to the novel assemblage of the sections, whereby the use of all positive connections is dispensed with, the outer section may yield with respect to the inner section with the utmost freedom in the performance of its function.

The manner of constructing the outer section permits of the ready assemblage of the wheel and its disposition with relation to the inner section causes the overlying parts to assume the functions of a positive guard in housing and protecting the concealed elements from the dust and the elements.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. A wheel of the type set forth comprising a fixed inner section, an outer section loosely surrounding the same and having its tread portion overlying the periphery of said inner section, said inner section having a projective annular portion adjacent its hub overlying said outer section and defining an annular recess, a pneumatic annular tube interposed between the periphery of said inner section and the tread of said outer section and one or more annular pneumatic tubes interposed in said annular recess.

2. A wheel of the type set forth comprising a fixed inner section, an outer section loosely surrounding the same, and having its tread portion overlying the periphery of said inner section, said inner section having an outwardly extending angular annular flange overlying said inner section adjacent to the edge thereof, and coacting with said edge to afford an annular recess, a pneumatic annular tube interposed between the periphery of said inner section and the tread of said outer section, and one or more annular pneumatic tubes interposed in said annular recess.

3. A wheel of the type set forth comprising a fixed inner section, an outer section loosely surrounding the same and having its tread portion overlying the periphery of said inner section, said outer section having a central opening, an outwardly extending flange provided upon said inner section adjacent the hub thereof and extending in approximately spaced parallel relation to the body of said section, said flange overlying the edge of the central opening of said outer section and coacting with said edge to define an annular recess, an annular pneumatic tube interposed between the periphery of said inner section and the tread of said outer section, and one or more annular pneumatic tubes interposed in said recess.

4. A wheel of the type set forth comprising a fixed inner section, an outer section of U-shape in cross section loosely surrounding said inner section and having parallel side portions overlying said inner section, said side portions each having a central opening, said inner section being provided on each side thereof with annular outwardly extending flanges overlying said respective side portions, and coacting therewith to define annular recesses, and spaced away from said inner section, a pneumatic annular tube interposed between the periphery of said inner section and the tread of said outer section, and one or more annular pneumatic tubes interposed in said recesses.

In testimony whereof I affix my signature in presence of two witnesses.

WILLIAM F. MASON McCARTY.

Witnesses:
HENRY BAKER,
ROBERT B. HOWLAND.